United States Patent [19]

Videlock et al.

[11] Patent Number: 5,251,213
[45] Date of Patent: Oct. 5, 1993

[54] MULTIPORT SOURCE ROUTING TOKEN RING BRIDGE APPARATUS

[75] Inventors: Gary B. Videlock, Foxborough; Russell C. Gocht, N. Attleboro; Tom P. Gloria, Cambridge; Douglas Wainer, Roslindale, all of Mass.

[73] Assignee: Microcom Systems, Inc., Wilmington, Del.

[21] Appl. No.: 881,806

[22] Filed: May 12, 1992

[51] Int. Cl.⁵ .............................................. H04J 3/02
[52] U.S. Cl. ................................ 370/85.12; 370/85.13; 370/85.14
[58] Field of Search ............... 370/85.14, 85.13, 85.12; 340/825.05

[56] References Cited

U.S. PATENT DOCUMENTS

| | | | |
|---|---|---|---|
| 4,901,312 | 2/1990 | Hui et al. | 370/85.12 |
| 4,922,503 | 5/1990 | Leone | 370/85.13 |
| 5,081,621 | 1/1992 | Sugimoto | 370/85.13 |
| 5,086,426 | 2/1992 | Tsukakoshi et al. | 370/85.14 |
| 5,088,090 | 2/1992 | Yakoby | 370/85.14 |
| 5,130,981 | 7/1992 | Murphy | 370/85.13 |
| 5,151,891 | 9/1992 | Suzuki | 370/85.13 |

Primary Examiner—Douglas W. Olms
Assistant Examiner—Ajit Patel
Attorney, Agent, or Firm—Schiller & Kusmer

[57] ABSTRACT

A multiport source routing token ring bridge is provided which permits a single local area network bridge to interconnect to multiple remote bridges without limitations on the number of rings and bridges interspersed between a data packet's source and its intended destination. The bridge receives a packet and then scans the packet for ring-in information which matches the ring to which the bridge is attached. If this match is not successful, then the packet is not passed to the software and the address recognize and frame copy bits at the end of the packet are not set. If the match is successful, then the bridge number and next ring-in (or ring-out) segment information from the packet are used as addresses to a static RAM array. The array is preprogrammed with all valid bridge number and ring-out combinations which may be accessed by the multiport source routing bridge. If addressing of the array produces a valid indication, then the packet is passed to software for forwarding to the appropriate local area network or wide area network ports. On the other hand, if the address does not produce an indication that it can be reached through the bridge, then the hardware parses the packet to extract the next ring and bridge information, and repeats the above process until either a complete match is found and the packet is passed, or the information field is exhausted and the packet is finally rejected.

13 Claims, 7 Drawing Sheets

MULTIPORT SOURCE ROUTING TOKEN RING BRIDGE APPARATUS

This invention relates, generally, to the field of computer communications networks and more particularly to an improved bridge apparatus which may be used in conjunction with a token ring network.

BACKGROUND OF THE INVENTION

Recently, as computer networks have grown and expanded, it has become apparent that there exists a need to be able to connect local area networks (LAN) and wide area networks (WAN) together in order to build larger, extended local area and wide area networks. In order to interconnect individual local area and wide area networks, devices known as bridges have been developed. In practice, when connecting two separate networks together, the bridge is a device which coexists on the two networks and thereby acts as a gateway for the transmission of data from one network to the other. However, rather than passing all data packets which are presented to the bridge, from one network to the other, it is well known that in order to increase bridge throughput, and not to allow a bridge to place an undue burden on the networks to which it is attached, the bridge must prevent (a) data packets with local destinations from crossing the bridge, and (b) data packets from crossing one network to another when such crossing will not put the packet on a path that will allow it to successfully reach its destination.

When networks are small and localized, individual two port bridges for connecting together two networks are sufficient to carry data and still provide acceptable response times. However, as data networks grow and interconnect to more local area and wide area networks, the limitations found in bridges of the prior art, as well as those limitations inherent within the network specifications themselves, make the economical expansion of networks and efficient transmission of data more difficult. This is especially true in the case of networks which utilize source routing, the most popular example of which is the IBM Token Ring Network.

Under the source routing protocol supported by the IBM Token Ring Network Architecture, a data packet which is to be relayed from one network to another network, across a bridge, includes source routing information which defines the exact route the data packet should traverse. However, because of limitations in the present token ring source routing protocol, currently available source routing token ring bridges are able to support only a single pair of input and output connections (such as a LAN to LAN connection or an LAN to WAN connection). Unfortunately, since these prior art bridges may only pass data from one pre-defined network to another pre-defined network, if a packet's destination is located some distance away from the source, (i.e., the destination is at a remote location electrically connected through at least one additional bridge on another network), then, depending upon the network topography, the packet may have to pass through many bridges and rings (up to seven bridges and a total of eight rings) before arriving at its destination, thus placing an unacceptable load on the interconnected networks and thereby slowing system throughput.

One example of a local area network bridge is illustrated in U.S. Pat. No. 4,922,503, issued to Leone on May 1, 1990. Leone illustrates a bridge for interconnecting local area networks. In Leone, the bridge makes a decision on whether or not to forward a data packet across the bridge based upon the packet's destination address. Unfortunately, this technique of "destination address filtering" is not helpful in constructing a multiport bridge (adapted to be connected to more than two networks) to be used in a token ring environment, since as noted, the token ring architecture utilizes a "source routing" protocol, in which the originating station determines the route a packet should take to its destination.

Therefore, noting the problems described above, and understanding the unavailability of a solution using destination address filtering, one example of an improved bridge for use with token ring source routing is noted in U.S. Pat. No. 4,901,312 "Remote Interconnection of Local Area Networks" issued to Hui et al. on Feb. 13, 1990. Under the Hui patent, token ring type local area networks may be connected together by the use of virtual or pseudo rings, which provide a technical fiction used to create a pseudo "network" between remote token rings. In Hui, each actual token ring network is connected to a pseudo token ring network by a respective half-bridge. The half-bridge then enters a number representing the pseudo ring in the source routing information field of the packet it forwards over the pseudo ring network to a remote half-bridge and remote ring. By using the disclosure of Hui, wide area networks are considered token ring local area networks by the respective half-bridges for the purpose of specifying source routing information. This permits a half-bridge comprised of a LAN module and a WAN module to be connected to another remotely located WAN or LAN module half-bridge. However, by using the architecture shown in Hui, LAN segment numbers must be assigned to wide area network links, which diminishes the already limited number of LAN segments that may be linked together. In particular, assigning LAN segment numbers to WAN links essentially halves the number of real LAN's that can be connected. As noted in the original IEEE 802.5 source routing specification, up to 8 segment number fields may be provided in a packet, which, in turn, allows the packet to specify a destination up to seven segments away. However, if each of the segments are connected by bridges using the Hui et al. method, a packet is limited to finding a destination which is a maximum of only three segments away, since the remaining four segments are used up by being assigned to intermediate "pseudo rings".

Recognizing this limitation, the IEEE has recently received proposals to change the current token ring standard by lengthening the information fields provided within a data packet in order to accommodate more segment number fields and longer ring-in/bridge number/ring-out fields. This additional length will allow "virtual" or "pseudo" rings to be constructed out of existing LAN links, in a manner similar to that taught in Hui, without severely limiting the maximum number of "hops" a destination may be away from a source. However, if the changes proposed by the IEEE are implemented, there will be a class of equipment already on the market which will be non-compliant with the revised specification.

Accordingly, it has been determined that the need exists for an improved multiport source routing bridge apparatus which may operate in accordance with the IBM Token Ring Protocol or IEEE 802.5 Protocol to interconnect several ports such as a LAN to LAN to LAN or LAN to WAN to WAN and which may also be used for connecting multiple virtual circuits, as may be found in a switched packet network over a single WAN port, without limiting the "fan-out" of the bridge.

OBJECTS OF THE PRESENT INVENTION

It is, therefore, an object of the invention to provide an improved multiport source routing bridge apparatus.

It is an additional object of the invention to provide an improved multiport source routing bridge apparatus which may be used to bridge token ring networks.

It is another object of the invention to provide an improved multiport source routing bridge apparatus which may connect a local area network to multiple local area networks or multiple wide area networks, or any combination thereof.

It is a further object of the invention to provide an improved multiport source routing bridge apparatus which makes a real time determination as to whether or not a source routed packet should be forwarded by a bridge.

It is still another object of the invention to provide an improved multiport source routing bridge apparatus which may allow a single bridge to connect together and route between up to 4,096 rings.

It is still a further object of the invention to provide an improved multiport source routing bridge apparatus which may be easily and inexpensively manufactured.

Still other objects and advantages of the invention will, in part, be obvious and will, in part, be apparent from the specification.

SUMMARY OF THE INVENTION

Generally speaking, in accordance with the invention, an improved multiport source routing bridge apparatus is provided. The invention permits a single local area network bridge to interconnect to multiple remote bridges. The invention also permits a single wide area network port to be connected to a packet data switching network which may thereby provide an interconnection to a large number of virtual circuits connected to multiple end points.

In a preferred configuration, the multiport source routing bridge of the invention receives a packet containing routing information from a local area network to which it is attached. This routing information contains a number of segment number fields which specify the ring-in, bridge number and ring-out paths the data packet must pass through in order to move from the source to the destination. The routing information is scanned for a ring-in value to determine whether the ring-in value matches the ring to which the input of the invention is connected. If this match is not successful, the packet is not passed to the bridge microprocessor, and its associated software, for transmission over the bridge, and the "address recognized" and "frame copied" bits at the end of the packet are not set.

On the other hand, if the ring-in value matches the ring to which the input of the invention is connected, then the bridge number and ring-out information portions of the routing information are used as addresses to a static RAM array. This array is preprogrammed, upon initialization of the bridge and network, with all valid bridge number and ring-out combinations which the multiport bridge of the invention is directly or remotely connected to. If, after providing the bridge number and ring-out information to the RAM array, a match indication is provided, then the packet is passed to software for forwarding to one of the connected LAN or WAN ports. On the other hand, if a valid match is not made, then the current ring-in information is discarded and the next segment containing the next ring-in information field is processed in a similar manner. This process is repeated until either a complete match is found or the routing information field is exhausted.

In practice, the invention makes a real time determination as to whether or not a source routed packet should be forwarded by a multiport bridge. Since the microprocessor of the bridge only forwards packets when it has been determined that a valid ring-in, bridge number and ring-out have been recognized, the bridge has the ability to filter all source routed local area network packets regardless of the load of data on the network. Therefore, the filtering rate of the bridge is not a function of the performance of the microprocessor, since the microprocessor is only given source routed packets which need to be forwarded to a remote LAN or WAN. In addition, because the invention provides for a multiport bridge apparatus, the invention does not limit the number of ports which may be interconnected by the bridge.

As described in the IBM Token Ring Network: Architecture Reference, Third Edition, September 1989, pub. #SC30-3374-02, twelve-bits are reserved to assign to each individual ring number. Therefore, by utilizing all twelve-bits, up to 4,096 individually numbered rings may be identified and conceivably interconnected by a single bridge. Since the invention provides for a multiport source routing bridge apparatus, by practicing the invention as taught, a single bridge could be built which would be able to link together and route between all 4,096 rings.

The invention accordingly comprises the features of construction, combinations of elements and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which.

DETAILED DESCRIPTION OF THE DRAWINGS

This invention is particularly well suited for application in a network environment in which source routing is practiced. The IBM Token Ring Protocol, as specified in the IBM Token Ring Network Architecture Reference (pub. #SC30-3374-02), and the token ring source routing specification published by the IEEE (IEEE 802.5) are two such examples of source routing protocols in use today. Therefore, while this invention may be adapted to work with other source routing network systems, application of this invention will be described with reference to the source routing network systems as presently described in the IBM/IEEE Token Ring Network. The architecture of these token ring networks is well-known and will not be described in detail in the present application. In addition, the construction of a token ring data packet is also well-known and will also not be completely described. Accordingly, the token ring architecture described in the IBM specification and IEEE specification are incorporated herein by reference.

Figure 1:
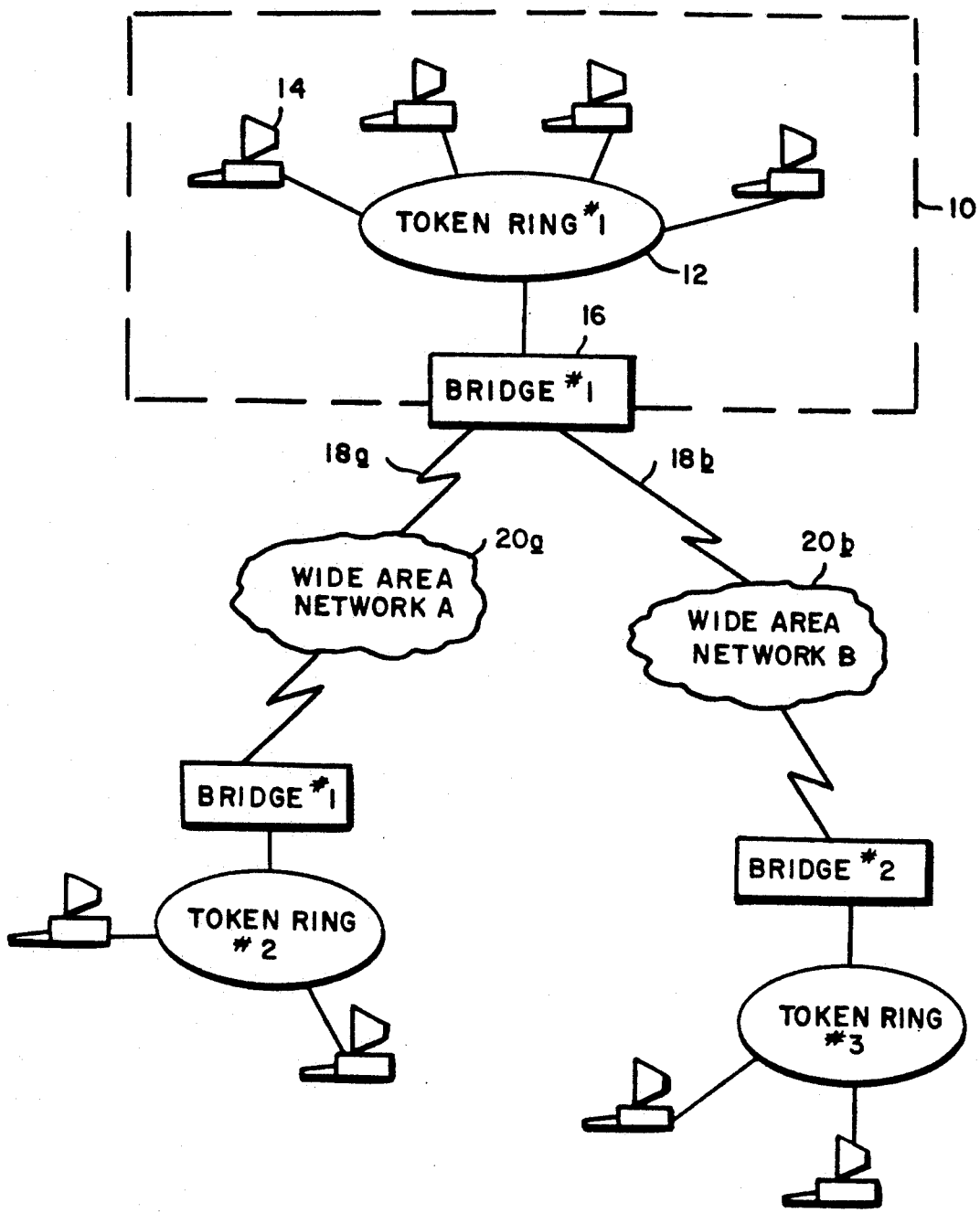
FIG. 1 is a block diagram illustrating the interconnection of three token ring networks through a bridge constructed in accordance with an embodiment of the instant invention.

Referring first to FIG. 1, a block diagram illustrating the interconnection of three token ring networks through a single bridge constructed in accordance with an embodiment of the present invention is shown. As illustrated, each of the three token ring networks to be connected together, token ring #1, token ring #2 and token ring #3, and their respective bridges are capable of passing data packets incorporating source routing data in compliance with the current token ring standard. By way of description, source routing differs from the form of destination address routing which is more commonly practiced in Ethernet networks in that in a source routing network, the originating station, or source station, is responsible for specifying the route (including rings and bridges) over which a packet must travel in order to reach its specified destination. Such routing is made possible through the use of an optional routing field, which is a part of the token ring packet specification and which will be defined more completely hereinafter.

In token ring networks supporting source routing, when a packet is to be transferred from a station on one ring to a station on another ring, the packet may need to be sent across a bridge. In the prior art, source routing token ring bridges supported only a single pair of connections with the bridge directly connecting two single specified local area networks, or directly connecting a single specified local area network and a single specified wide area network. The implementation of such a bridge was relatively straight forward since the bridge was always permanently connected at either end. Therefore, when a packet to be passed through the bridge was presented, the bridge would examine the ring-in, bridge number, and ring-out information present in the packet's source routing data field and compare these three values to previously defined fixed values. If the bridge of the prior art found a match for all three values, then the packet was transmitted across the bridge.

The limitation of this prior art architecture is that it may only connect a single network to another single network, thereby limiting the flexibility in the creation of a network topology. The source routing bridge of the instant invention, on the other hand, allows the interconnection to multiple ports providing for the bridging of packets from a single token ring LAN to two or more token ring LAN's, a single or multiple WAN, or any combination. The multiport source routing bridge of the invention receives a packet through its local area network port for possible forwarding to one of its multiple output ports, (or virtual circuits which may be associated with a single WAN). The bridge then determines the destination port by extracting it from the routing field in the source routed packet. As noted, this information is in the form of three values: ring-in, bridge number and ring-out. Whereas in the prior art a simple two-port bridge merely compared this ring-in, bridge number and ring-out information to previously fixed values, in the multiport bridge of the invention, only the ring-in number of the information field is fixed and refers to the ring number assigned by a network administrator to the ring which is attached to the input of the multiport source routing bridge. Thereafter, since there may be more than one bridge number/ring-out combinations which will be capable of being reached, depending upon the local area network and wide area network ports which are supported by the bridge, after comparing the fixed ring-in number, the invention will then compare each bridge number and ring-out number combination to its own bridge number and ring-out connections to determine whether a valid bridging may occur.

As can be seen in FIG. 1, a local area network generally referred to as 10, is built around a first token ring #1. Token ring #1 utilizes a LAN interconnection medium 12 to connect a plurality of nodes 14. These nodes may be data terminals, computers, or other devices which may attach to, transmit, receive and pass data over the network. Each node may represent equipment supplied by a different vendor, but all nodes communicate across the local area network medium 12 in accordance with the token ring type packet protocol.

Occasionally, it is necessary for one of the nodes 14 on token ring #1 to communicate with another node which is not directly connected to LAN medium 12. In such a situation, a bridge is required to interconnect two or more networks. As has been discussed earlier, it is advantageous to have the capability to "fan-out" (or connect) a single local area network bridge to multiple remote bridges and remote local area networks rather than be limited to a simple ring-bridge-ring architecture. In addition, it is desirable to be able to interconnect a single local area network through a bridge to a wide area network which may itself be connected to a packet data network having multiple end circuits. In such a situation, the wide area network will provide convenient access to multiple networks, thereby extending the potential fan-out of the entire system.

In the example shown in FIG. 1, token ring #1 is connected through media 12 to its bridge #1, designated as 16. Bridge 16 is a multiport source routing bridge constructed in accordance with a preferred embodiment of the instant invention and is illustrated as having two output ports, connecting token ring #1 to wide area network A and wide area network B. Wide area network A is further connected to token ring #2 through its own bridge (also designated bridge #1 by the network administrator for token ring #2, but differentiated from bridge #1 connected to token ring #1), while wide area network B is connected to token ring #3 through its own bridge #2.

Figure 2:
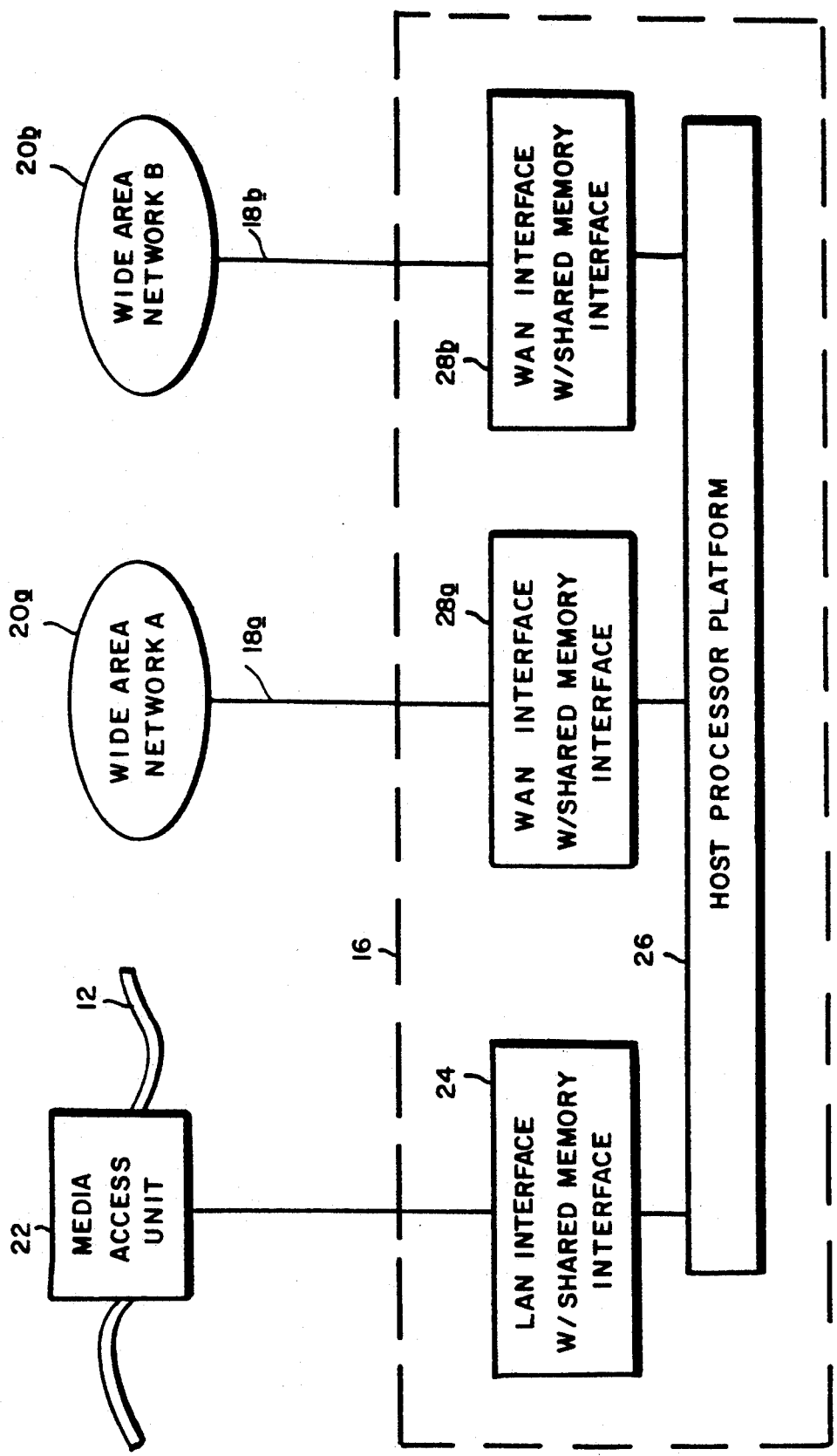
FIG. 2 is a block diagram illustrating a multiport remote bridge architecture interconnecting a single LAN interface board and two wide area network interface boards constructed in accordance with an embodiment of the instant invention.

Referring next to FIG. 2, the block diagram of bridge #1, referred to as 16 in FIG. 1 is shown. As can be seen, multiport source routing bridge 16 is connected to token ring #1 through a media access unit (MAU) 22. Media access unit 22 provides an electrical connection between token ring medium 12 and a LAN interface 24 and is configured to provide appropriate data and clock recovery. LAN interface 24 also communicates with a host processor platform 26 which provides for the passing of data through either wide area network interface 28a or 28b and on through a link 18a or 18b to wide area network A (20a) or wide area network B (20b). The construction of this host processor platform and the interface between LAN interface 24 and wide area network interface 28a and 28b is well-known, and is beyond the scope of this disclosure.

Figure 3:
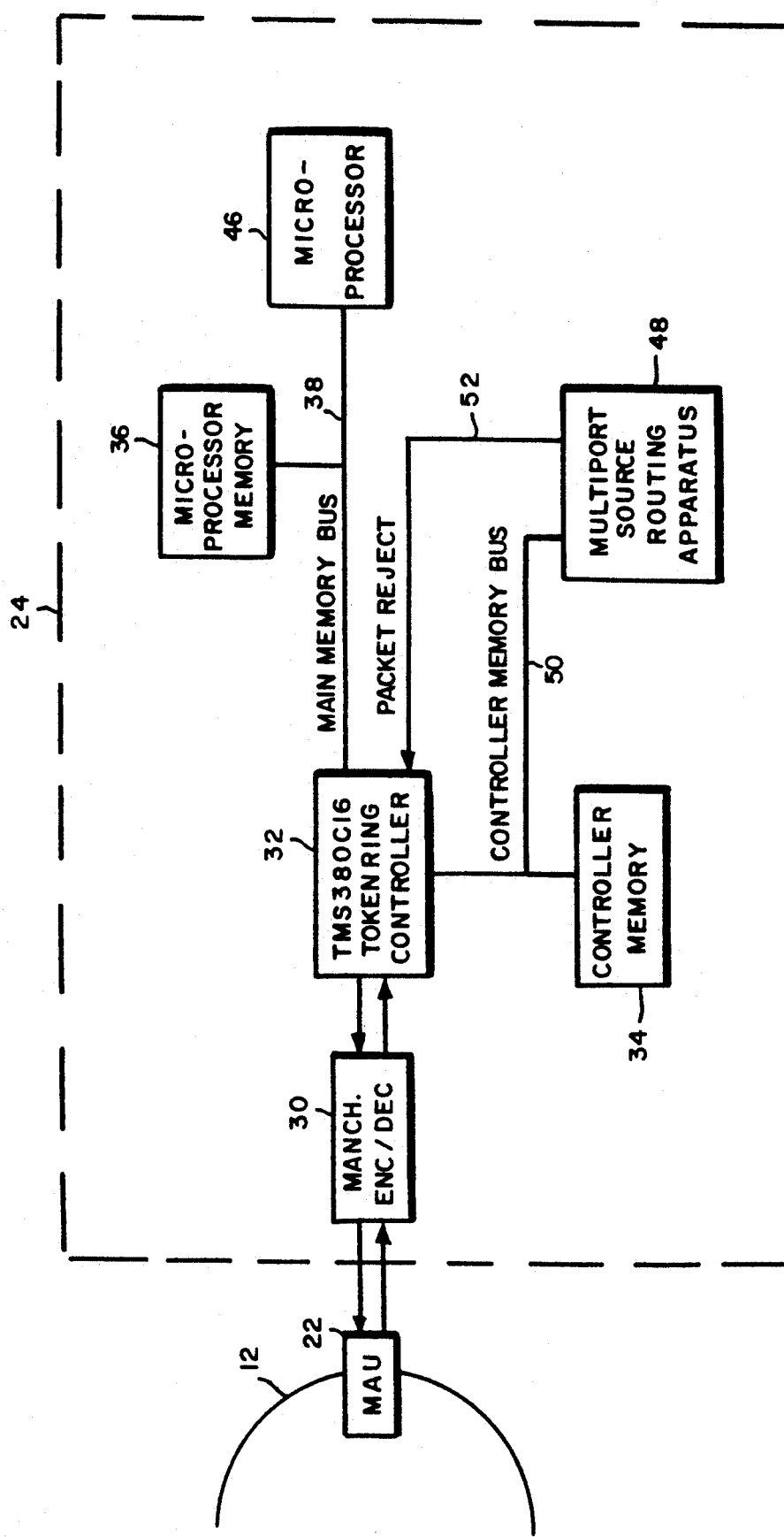
FIG. 3 is a block diagram illustrating a multiport source routing bridge apparatus constructed in accordance with a preferred embodiment of the invention.

Turning to FIG. 3, a more detailed view of LAN interface 24 of FIG. 2 is provided. As can be seen, media access unit (MAU) 22 communicates with LAN medium 12 and, as noted earlier, provides an interface with the local area network interface 24. In particular, media access unit 22 communicates directly with a Manchester encoder/decoder 30. Manchester encoder/decoder 30 converts signals to and from the data signals and clock signals which are received from and transmitted to token ring controller 32. In the preferred embodiment of the present application, token ring controller 32 may incorporate a token ring communications processor such as the Texas Instruments TMS 380C16 Eagle Chip, which is a 16/4 MBPS Token Ring Controller Chip. Token ring controller 32 is connected to its own token ring controller memory 34 across a token ring controller memory bus 50. Token ring controller 32 is also connected to the main memory bus 38 of the local area network interface which communicates with a microprocessor 46 and a microprocessor memory 36. Token ring controller 32 transmits and receives data to and from Manchester encoder/decoder 30 using direct memory access to and from the token ring controller memory bus 50.

In operation, the preferred embodiment of the multiport source routing bridge apparatus 48 of the invention monitors the contents of the token ring controller memory bus 50. Based upon the operation of the multiport source routing apparatus 48, the preferred apparatus provides a packet reject signal 52 to token ring controller 32 indicating whether to reject a packet or accept a packet. If a packet is rejected, the token ring controller 32 stops receiving the packet into token ring controller memory 34 and does not set the Address Recognized (AR) or Frame Copied (FC) bits within the packet. On the other hand, if the packet is accepted, then token ring controller 32 moves the packet into microprocessor memory 36 and signals microprocessor 46 that it has received a packet which should be forwarded to a remote destination. At the same time, token ring controller 32 sets the address recognized and frame copied bits at the end of the packet. In this way, microprocessor 46 does not have to process packets which will not traverse the bridge of the invention, thus allowing microprocessor 46 to process bridge data without placing an unnecessary load on the LAN.

Figure 4A:
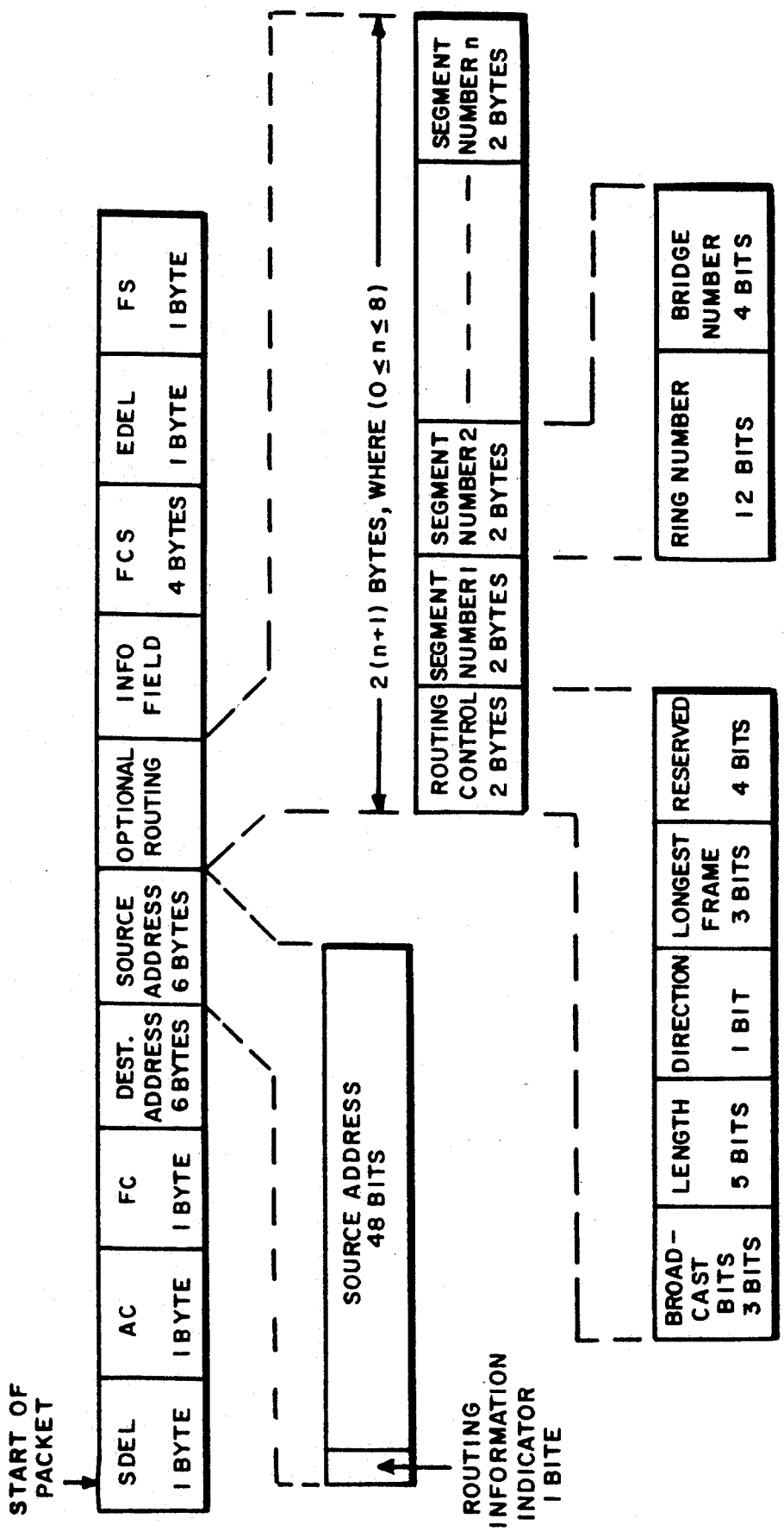
FIG. 4a is a diagram illustrating a typical data packet comprising source routing information.

Referring next to FIG. 4a, the structure of a source routed data packet which may be transmitted in accordance with the invention is shown. As discussed above, the structure of the packet is well-known and conforms with the token ring standard set forth by the IBM token ring standard and IEEE standard 802.5. In particular, the packet is comprised of a one byte starting delimiter field (SDEL); a one byte access control field (AC); a one byte frame control field (FC); a six byte destination address field which specifies the address of the network station that the frame is destined for (but which is not used in the routing of a source routing apparatus); a six byte source address field, including a one bit routing information indicator bit; an optional routing field having a length of up to eighteen bytes, and including routing control information comprising broadcast bit data, routing field length, routing field parsing direction data, and an indication of the longest frame, as well as up to eight routing segments comprising ring numbers and bridge numbers; an information field; a four byte frame check sequence (FCS) field which is used to determine check-sum errors occurring within transmission; a one byte ending delimiter field (EDEL); and a one byte frame status (FS) field containing information as to address recognition and frame copy.

Under control of the multiport source routing bridge apparatus of the invention, the number of bytes from the beginning of the start of a packet are counted until the start of a source address can be read. As noted, the most significant bit of the source address is the routing information indicator which indicates to the apparatus whether or not the optional routing field is present. If the routing information indicator bit is not set, then the apparatus (and in the absence of a supplemental transparent bridge apparatus) will indicate to the token ring controller 32 to reject the current packet without transmission across the bridge. If, on the other hand, the routing information indicator bit is set, then the apparatus will count the remaining number of bytes in the source address field to the beginning of the optional routing field. At this point, the multiport source routing bridge apparatus will read the first two bytes of the optional routing field which, as shown in FIG. 4a, contain the routing control information. As noted above, the routing control field contains a number of informational bits. The first bits which are important to the apparatus are the first three bits which are the broadcast bits. These bits, if set to broadcast mode, will inform the source routing bridge to pass the packet to all possible recipients. In such a case, if the packet is a broadcast packet, the multiport source routing bridge will indicate to the token ring controller to accept the packet. On the other hand, if the packet is not a broadcast packet, then the next five bits, indicating the length of the routing control data field (which in turn can be used to calculate the number of routine segments) will be latched into a counter. These five bits indicate the amount of data remaining in the optional routing field, which tells the multiport source routing bridge apparatus the path including bridges and rings which the packet must take to arrive at its destination.

The final bit of importance in the routing control field is the direction bit. The direction bit indicates to the bridge apparatus whether it should parse the routing segments (including ring and bridge numbers) information in a forward or backwards direction (and is illustrated more clearly in FIG. 4b).

Figure 4B:
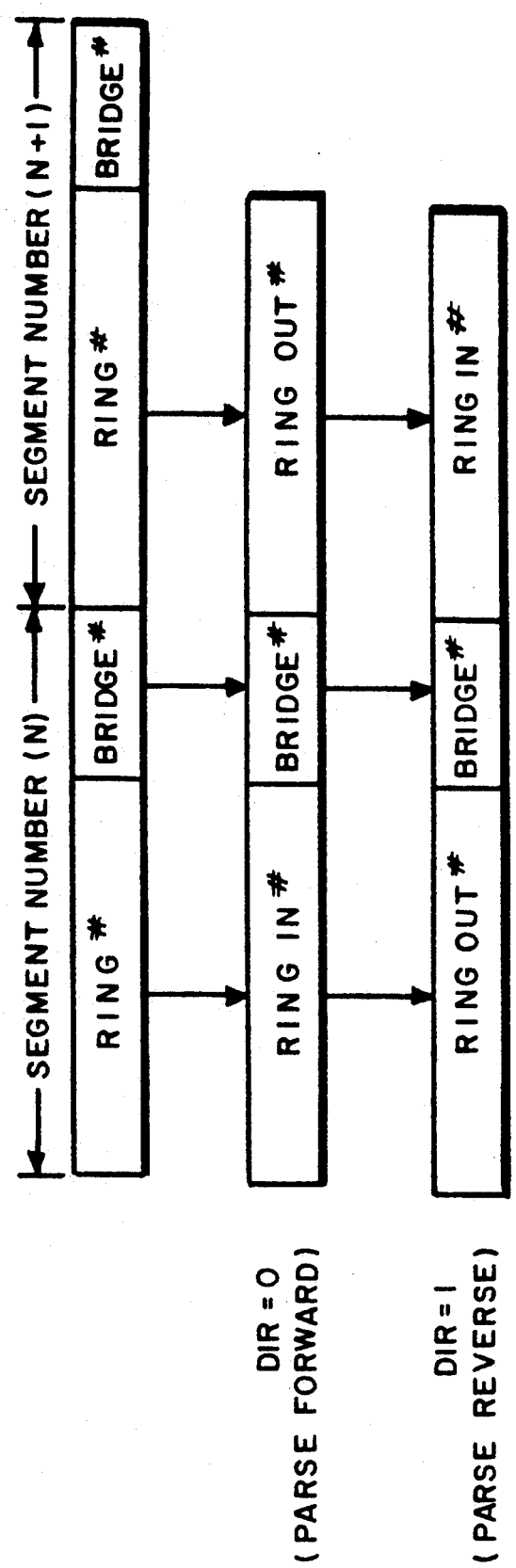
FIG. 4b is a diagram illustrating the combination of successive segments to yield ring-in, bridge number and ring-out data.

Referring to FIG. 4b, once the apparatus has determined that the packet to be processed is, indeed, a source routing packet, and once the length of the routing information segments and the parsing direction is determined, the preferred apparatus of the invention next makes a determination as to whether or not the packet should be passed from token ring controller 32 to microprocessor 46 for bridging to a connected LAN or WAN. Assuming that the direction bit indicates that parsing should proceed in a forward direction, the first step is to examine the first ring number in the first segment (or segment N). This first ring number is compared to a fixed register which is set by microprocessor 46 at the initialization of the apparatus, and which configures the adapter to be aware that it is connected to a ring number selected by a local network administrator. This fixed ring number is assigned to the ring in accordance with the IEEE 802.5 specification, and identifies the ring attached to the input of the source routing bridge of the invention. If the comparison between the first ring number and the ring number of the input bridge is false, then the length counter is decremented and the second ring number found in the second segment (or segment N+1) is compared in the same way. This process continues until a match is found. If the length counter reaches zero before a ring number matching the ring number assigned to the input ring is found, then we know that the ring connected to the input port of the multiport source routing bridge apparatus is not a ring through which the packet should pass and, therefore, the packet should not be passed by the bridge. In such a case, the apparatus will signal the token ring controller to reject the packet.

On the other hand, if a match is found, the apparatus of the invention next compares the bridge number of the multiport source routing bridge to the bridge number of the associated segment (with matching ring-in number) to look for a match. Such a match indicates that the input ring attached to the input of the multiport source routing apparatus is in fact a ring through which the data packet should be routed, and that the bridge associated with the matching ring number is the bridge through which the packet should be routed. As with the ring-in comparison, should the bridge number of the multiport source routing bridge not match the bridge number of the current segment, then the next segment (N+1) is latched and the comparison process begins again until a match is made or the length counter reaches zero.

Finally, then, assuming that the ring-in and bridge numbers match, the apparatus of the invention examines the ring-out data of the packet to determine whether the multiport bridge of the invention is, in fact, connected to the next ring in the source routing path.

Since, as noted in FIG. 4b, segment numbers are made up of ring numbers and bridge numbers, the ring-out number of the Nth segment will be the ring-in number of the Nth+1 segment. This ring-in number is then compared with a memory array which stores a table of all valid rings to which the output of the multiport source routing bridge is connected. While separate memory for bridge numbers and ring-out numbers may be used, in the instant invention, it is found to be advantageous to use a single memory array to hold a table of all valid four-bit bridge numbers and twelve-bit ring-out numbers. These two values are then concatenated to arrive at a sixteen-bit value which may be used as an address to the memory array. In a preferred embodiment, this sixteen-bit address memory is comprised of a 64K by 1 static RAM. During initialization of the apparatus, the contents of the static RAM is cleared by the microprocessor to all 0's. Then, the microprocessor, reading from a table of valid bridge number and ring-out number combinations, programs the static RAM with logical 1's using these combinations as sixteen-bit addresses. When the multiport source routing bridge apparatus then presents a bridge number, ring-out number combination as a sixteen-bit address to the static RAM, the static RAM returns a 0 for invalid combinations and 1 for valid combinations. If a match between a bridge number and ring-out number concatenation and the data in the static RAM is not found, then the length counter is decremented by one and the ring-out number used in the current concatenation becomes the next ring-in number for comparison to the fixed ring register of the input ring, as described above. (Assuming the length counter has not already been decremented to zero). However, if a match is found between the ring-in number and the concatenated bridge number and ring-out number combination, then the apparatus will indicate to the token ring controller to accept the data packet and pass it to the microprocessor for transmission across the bridge.

Figure 5:
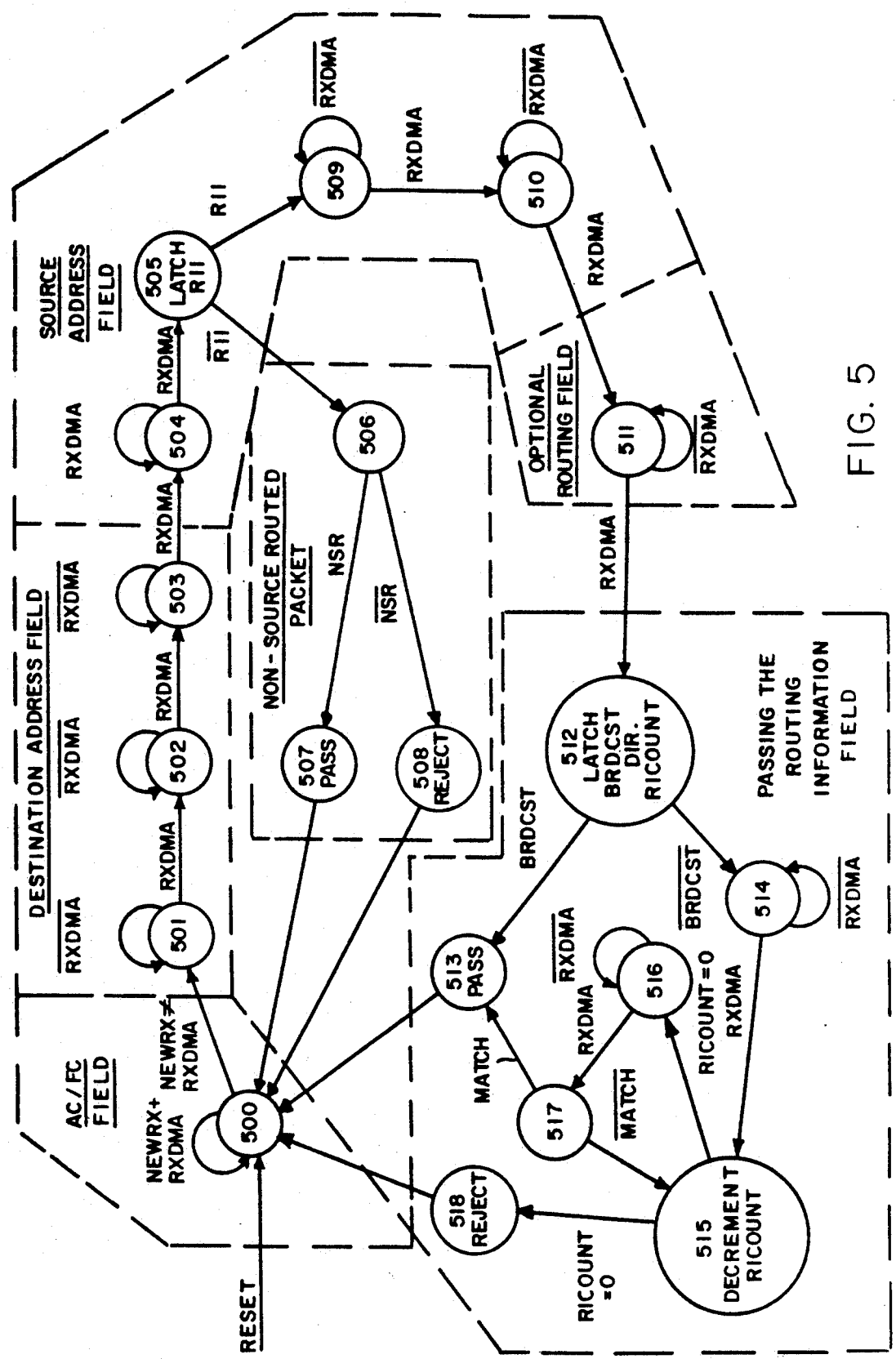
FIG. 5 is a state diagram illustrating the examination and selective forwarding of source routed packets in accordance with a preferred embodiment of the invention.
Figure 6:
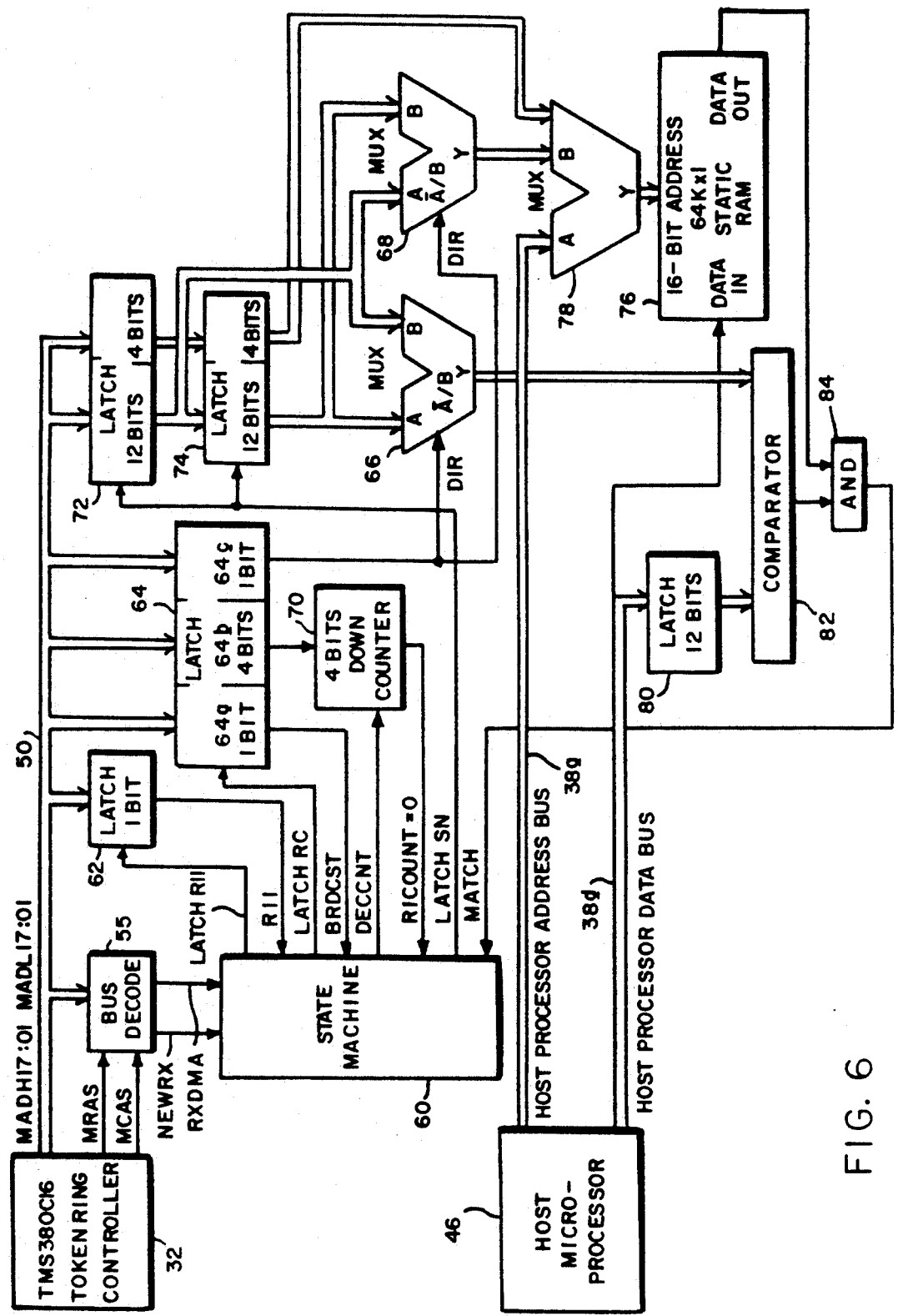
FIG. 6 is a block diagram of a state machine for executing the state diagram illustrated in FIG. 5.

Referring now to FIGS. 5 and 6, a state diagram is shown in FIG. 5, and a block diagram of a state machine, which may execute the state diagram of FIG. 5, is shown in FIG. 6. As noted earlier, the state machine is that portion of the multiport source routing apparatus 48 which communicates with the token ring controller 32 and microprocessor 46 and which subsequently makes the determination as to which packets should be passed and which packets should not be passed. A description of the state diagram of FIG. 5 follows along with a discussion of the block diagram of FIG. 6. Therefore, in order to understand the accompanying state diagram and block diagram, the following signals are identified:

| | |
|---|---|
| MADH[7:0], MADL[7:0] | Multiplexed Address/Data bus 50 (sixteen-bits total from the token ring controller 32 used to move data and instructions between token ring controller 32 and its local memory 34. |
| MRAS | Signal from token ring controller 32 used to demultiplex the first quarter of the MAD bus cycle. On the leading edge of this signal controller 32 places a sixteen-bit memory address on the multiplexed bus 50. On the trailing edge, the data to/from controller 32 and its local memory 34 is valid. |
| MCAS | Signal from controller 32 used to demultiplex the second quarter of the MAD bus cycle. On the leading edge of this signal, controller 32 places an eight-bit status field (containing NEWRX and RXDMA indicators) on the MADH[7:0] portion of the MAD bus. |
| NEWRX | New Receive. Signal from controller 32 to the apparatus 48 that indicates a new packet is being received. This signal becomes active when the first sixteen-bits (the AC/FC bytes, see FIG. 4a) of the new packet are being transferred from controller 32 to its local memory 34. |
| RXDMA | Receive DMA. Signal from controller 32 to the apparatus 48 that indicates a sixteen-bit word of a received packet is being transferred from controller 32 to its local memory 34. This signal is used to count the number of transfers from the beginning of the packet to where the apparatus is interested in looking at the data of the packet. |
| latchRII | Signal from state machine 60 to one bit flip-flop 62 that latches the Ring Information Indicator (RII) bit contained in the Source Address as the Source Address is being moved from controller 32 to its local memory 34. |
| RII | Routing Information Indicator. This signal is sampled from the received packet when the apparatus counts RXDMA's to the most significant word of the source address (ninth byte, see FIG. 4a). It tells the state machine 60 whether or not the incoming packet is using the source routing protocol. |
| NSR | Non-Source Routed. This signal is set by the microprocessor 46 to tell the apparatus 48 how |

| | |
|---|---|
| | to handle non-source routed packets as they are received. If this signal is set, then the apparatus 48 will tell controller 32 to pass all non-source routed packets to the microprocessor 46. If this signal is clear, then the apparatus 48 will tell controller 32 to reject all non-source routed packets. |
| latchRC | Signal from state machine 60 to six flip-flops 64 that latch the relevant bits from the Routing Control (RC) field as the RC field is being moved from controller 32 to its local memory 34. |
| BRDCST | Broadcast. This signal is sampled from the received packet when the apparatus 48 counts RXDMA's to the routing control field (fourteen and fifteenth bytes). If it is set, then apparatus 48 tells controller 32 to forward the packet to the microprocessor 46. If it is not set, then the apparatus executes the remainder of the state machine 60. |
| RICOUNT | Ring In Count. These bits 64b are sampled at the same time as the BRDCST signal 64a. They form a four-bit counter indicating the number of sixteen-bit words in the routing information field (which consists of two routing control bytes and up to 7 two-byte segments numbers). |
| DIR | Direction. This bit 64c is sampled at the same time as the BRDCST signal and the RICOUNT bits. If determines the direction that the Ring Information field is parsed (forward or backward) as shown in FIG. 4b. The DIR bit controls two multiplexers 66 and 68 that switch the RING #'s of two consecutive segment numbers. |
| DECCNT | Decrement Counter. This signal causes the four-bit RICOUNT counter 70 to decrement. |
| latchSN | Signal from the state machine to 16 flip-flops 72 and 74 that latch the Segment Number (SN) field as the SN field is being moved from the controller 32 to its local memory 34. |
| RICOUNT = 0 | This bit signals the state machine when the RICOUNT counter 70 has decremented to zero. |
| MATCH | This bit is the output of the Static RAM 76 that provides an indication of valid BRIDGE_NUMBER/RING_OUT combinations. If this bit is a one when the BRIDGE_NUMBER/RING_OUT combo is presented as the address to the Static RAM, then the apparatus will indicate to the controller 32 to forward the packet to the microprocessor 46. If it is not set, then the apparatus looks at the next combo (if RICOUNT has not counted down to zero). |
| PASS | This signal is an indicator from the apparatus to the controller 32 to pass the packet to the microprocessor 46. |
| REJECT | This signal is an indicator from the apparatus to the controller 32 to reject the packet. |

Turning now to FIG. 5, a state machine 60 constructed in accordance with the invention is shown. After initialization, state machine 60 waits at state 500 until a NEWRX signal indicates that a new packet is being received. At the same time, the state machine waits for an RXDMA signal to indicate that a sixteen-bit (or two-byte) word of a received packet is being transferred from token ring controller 32 into its local memory 34. The two-bytes which are then waited out at state 500 are the AC byte and the FC byte. The state machine then moves on to states 501, 502 and 503 during which time two incoming bytes for each state are parsed, for a total of six-bytes which comprise the destination address. The state machine then moves to state 504 where the first two-bytes of the source address are parsed. It is these first two-bytes which contain the routing information bit RII. The state machine moves on to state 505 and checks to see whether the routing information bit RII has been set. If the routing information bit has not been set, then the state machine will move to state 506 where the state machine will, depending upon instructions from the microprocessor 46, pass all non-source routed packets in states 507 or reject all non-source routed packets in state 508. After executing the pass and rejects states, the state machine returns to state 500 to wait for the beginning of the next packet.

On the other hand, returning to state 505, if the routing information indicator bit (RII) is set, then we know that there is additional routing information in the optional routing field and the packet contains source routing data. At this point, the state machine passes through two more states 509 and 510 during which time it parses the remaining four-bytes of the source address. The state machine then flows to state 511 where it parses the next two-bytes in the data packet, which contain the first two-bytes of the optional routing field. As noted earlier, in the optional routing field, the first two-bytes, contain the routing control information which is comprised of the broadcast bits, the length bits and the direction bits. After latching the broadcast, length and direction bits, the state machine moves to state 512 and examines the broadcast bits. If the broadcast bits are set, then, according to token ring protocol, the packet must be passed to all stations, and the state machine will move to state 513 where it will pass the packet. On the other hand, the broadcast bits are not set, then the state machine will move from state 512 to state 514 parsing the next two-bytes of the optional routing field, which contain routing segment #1. This routing segment is made up of two-bytes comprising a twelve-bit ring number and four-bit bridge number. The state machine then executes state 515 which decrements the ring-in count. As noted previously, this ring-in count is initially set by examining the length bits of the routing control information in the optional routing field. These bits help to determine how many ring/bridge combinations are recorded in the optional routing field. Therefore, at state 515, the state machine makes a determination as to whether or not the last segment in the routing field has been read. If the ring-in counter does not equal zero, then the next segment is latched in at state 516. It is this step which brings in the ring number of the next segment which, as discussed earlier and shown in FIG. 4b, functions as the ring-out for the current ring-in/bridge combination. At step 516, the current bridge number and next ring-in number (or current ring-out number) are examined and compared to the look-up table prepared during initialization of the apparatus. This comparison takes place during state 517. If the combination of the ring bridge number and ring-out number are found in the look-up table, then the packet is passed at state 513 and the apparatus continues to state 500 to wait for the next packet. On the other hand, if no match is found in state 517, then the ring-in counter is decremented once again in state 515. As before, if the ring-in counter is still not 0, then the state machine moves to state 516 which pulls in the next two-bytes and a further comparison of bridge numbers and ring numbers continues as the state machine cycles between states 515, 516 and 517. If during this examination a match is found, then the state machine will execute state 513 and pass the packet to the microprocessor 46 for transmission to the distant bridge. On the other hand, if the ring-in counter should reach zero before a match is found, then the state machine will move to execute state 518 which will instruct the controller 38 to reject the current packet as not being forwardable by the bridge apparatus of the invention. Rejection occurs in state 518 which then returns to state 500 to await the next incoming packet.

The state machine for executing the state diagram of FIG. 5 is shown in FIG. 6. While the operation of the state machine is self-explanatory taken in connection with the state diagram of FIG. 5, a brief description will follow. As noted, a token ring controller 32 is connected to a multiplexed address and data bus 50 which is used to move data and instructions between the controller 32 and its local memory 34 (not shown). The controller also outputs two signals, the MRAS signal and the MCAS signal, described earlier. These signals and the bus feed a bus decoder 55 which provides the NEWRX and RXDMA signals to the state machine 60 to properly clock its operation. The system includes a one-bit RII latch 62 which gets a data input from the multiplex bus 50 and a control input from the state machine 60 and returns an output to the state machine 60. The apparatus further includes a six-bit latch 64 for latching the routing control field containing broadcast, length and direction bits. The routing control field latch 64 takes data from the multiplexed bus 50 and a control bit latchRC from the state machine 60 and returns a one-bit broadcast bit 64a to the state machine 60. Latch 64 also returns a one-bit direction bit 64c to a pair of multiplexers 66 and 68 which is used to determine whether the source routing information should be read forwards or backwards. Finally, the six-bit latch 64 returns a four-bit value 64b which is used as an input to a four-bit counter 70, which is used to calculate segment length. The four-bit segment counter 70 takes as a control input a decrement count signal from the state machine 60 and returns a positive indication when the ring in counter has reached a state of zero. Finally, the state machine provides a control output to two sixteen-bit latches 72 an 74 which are arranged in a serial fashion. The first sixteen-bit latch 72 is connected directly to the multiplex data bus 50 and provides its output in parallel to a second sixteen-bit latch 74. These two latches are used together in order to latch successive twelve-bit ring numbers and four-bit bridge numbers. Since, as noted earlier, it is important to latch two ring numbers (equating to ring-in and ring-out) and a bridge number, the latch arrangement is designed to permit the first latch 72 to originally latch the ring-in and bridge number and then to buffer this into the second latch 74 while the first latch 72 then receives the ring-out information (which, as noted earlier, is also the ring-in information of the next segment). The latched ring numbers and bridge numbers as then fed to a pair of multiplexers 66 and 68. The first multiplexer is used to compare the ring-in data with a latched twelve-bit value originally set by the host microprocessor 46 as being the fixed ring-in value. The second multiplexer 68 passes the ring-out value to a third multiplexer 78 which also takes as an input the original associated ring-in bridge number. This bridge number and ring-out number are then multiplexed with a control signal from the host microprocessor 46 to address a 64K × 1 static RAM 76. (However, if the packet is to be parsed in the reverse direction, then direction bit 64c will reverse the operation of multiplexer 66 and 68). The output of this RAM is then provided to an and gate 84 which also receives as an input the results of the comparitor 82 which examine the latched ring-in value from multiplexer 66 and the fixed ring-in information set by processor 46 in latch 80. If both of these values are positive, then and gate 84 will return a positive value to state machine 60 indicating a match, which will then permit state machine 60 to inform controller 32 to pass the packet to the host microprocessor 46 for transmission. On the other hand, either the comparitor's 82 value or the value derived from the static RAM 76 are negative, then no match signal will be provided and the state machine 60 will continue in its cycle, noted in FIG. 5 at states 515, 516 and 517.

Thus, according to the aforenoted teachings, a multiport source routing bridge apparatus is developed which may be used to determine if a received source routed packet should be passed on a the bridge to a connected local area network or wide area network.

Since certain changes may be made in the above apparatus, without departing from the scope of the invention herein involved, it is therefore intended that all matter contained in the above description or shown in the accompanying drawings shall be interpreted in an illustrative sense and not be limited.

What is claimed is:

1. A multiport source routing bridge apparatus, for selectively bridging a data packet between an input network and at least one output network, said data packet comprising routing information, said routing information further comprising at least ring-in identification information associated with said input network and ring-out identification information associated with said at least one output network, said multiport source routing bridge apparatus comprising:

first memory means for storing ring-in identification information identifying the input network to which the multiport source routing bridge apparatus is connected;

second memory means for storing ring-out identification information identifying each of the output networks to which the multiport source routing bridge apparatus is connected;

first packet parsing means for extracting ring-in identification information from a data packet;

second packet parsing means for extracting ring-out identification information from said data packet;

first comparison means for comparing said ring-in identification information extracted from said data packet with the ring-in identification information stored in said first memory means and providing a first indication signal, of a first predetermined value, when said extracted ring-in identification information is found within said first memory means; and second comparison means, responsive to said first indication signal when said first indication signal is of said first predetermined value, for comparing said ring-out identification information extracted from said data packet with the ring-out identification information stored in said second memory means and providing a second indication signal, at a second predetermined value, when said extracted ring-out identification information is found within said second memory means;

wherein said multiport source routing bridge apparatus will pass said data packet from said input network to said at least one output network when said first indication signal and said second indication signal respectively are of said first and second predetermined values.

2. The multiport source routing bridge apparatus, as claimed in claim 1, wherein said bridge apparatus is capable of selectively bridging said input network to at least two output networks, and wherein each of said two output networks is adapted to be bridged to at least one other network through at least one additional source routing bridge apparatus, and said routing information further comprises bridge identification information identifying each bridge apparatus through which said data packet must pass to reach its final destination, said multiport source routing bridge apparatus further comprising:

third memory means for storing unique bridge identification information identifying the source routing bridge apparatus which comprises said third memory means;

third packet parsing means for extracting bridge identification information from said data packet; and third comparison means for comparing said bridge identification information extracted from said data packet with the unique bridge identification information stored in said third memory means and providing a third indication signal of a third predetermined value, when said extracted bridge identification information is found within said third memory means;

wherein said multiport source routing bridge apparatus will pass a data packet from said input network to a select one of said two output networks, which output network is associated with the same ring-out identification information successfully found within said second memory means by said second comparison means, when said first indication signal and said second indication signal and said third indication signal respectively are of said first, second and third predetermined values.

3. The multiport source routing bridge apparatus, as claimed in claim 1, wherein said input network is a token ring network.

4. The multiport source routing bridge apparatus, as claimed in claim 1, further comprising:

processor means for processing a data packet when said first indication signal and said second indication signal are respectively of said first and second predetermined values, said processor means processing said data packet by passing said data packet to the output network identified in said ring-out identification information.

5. The multiport source routing bridge apparatus, as claimed in claim 4, further comprising:

controller means for controlling the flow of data packets from said input network to said processor means, said controller means accepting data packets for passing to said processing means when said first indication and said second indication signals are respectively of said first and second predetermined values;

wherein said data packet further comprises address recognized data bits and frame copied data bits; and said controller means sets respectively at fourth and fifth predetermine values said address recognized data bits and frame copied data bits when said controller means accepts a data packet for passing to said processing means.

6. The multiport source routing bridge apparatus, as claimed in claim 4, wherein upon initialization of said multiport source routing bridge apparatus, said processing means polls each of said output networks for ring-out identification information and stores the values returned by such polling in said second memory means.

7. The multiport source routing bridge apparatus, as claimed in claim 2, wherein at least one of said two output networks is a local area network.

8. The multiport source routing bridge apparatus, as claimed in claim 2, wherein at least one of said two output networks is a wide area network.

9. The multiport source routing bridge apparatus, as claimed in claim 8, wherein said wide area network interconnects with a packet switching network connected to multiple remote networks, and wherein each of said multiple remote networks is recognized by said multiport source routing bridge apparatus as an output network.

10. The multiport source routing bridge apparatus, as claimed in claim 2, wherein said ring-in identification information is represented as a twelve bit binary number and wherein said bridge identification information is represented as a fourth bit binary number, and wherein said ring-out identification information is represented as a twelve bit binary number.

11. The multiport source routing bridge apparatus, as claimed in claim 2, wherein said routing information further comprises a plurality of ring-in identification information segments and a plurality of bridge identification information segments and wherein said ring-in identification information segments and said bridge identification information segments are arranged serially and respectively alternately in said data packet, a first ring-in identification information segment being identified as the ring-in identification information of an Nth segment and a second ring-in identification information segment being identified as the ring-in identification information of an Nth+1 segment, said ring-out identification information of said Nth segment comprising said ring-in identification information of said Nth+1 segment.

12. The multiport source routing bridge apparatus, as claimed in claim 10, wherein said four bit binary number representing bridge identification information and said twelve bit binary number representing ring-out identification information are concatenated to form a sixteen-bit binary number and wherein said second memory means and said third memory means are combined to form a single memory means, and wherein said second comparison means and said third comparison means are combined to form a single bridge identification information and ring-out identification information comparison means, said single memory means being arranged as a 64K×1 bit memory, said combined comparison means providing a sixteen-bit binary number to address said single memory means, said single memory means providing a positive indication when the contents of said single memory means at an address identified by said sixteen-bit binary number is positive.

13. The multiport source routing bridge apparatus as claimed in claim 1, wherein said bridge apparatus is capable of selectively bridging an input network and at least two output networks, wherein said multiport source routing bridge apparatus passes a data packet from said input network to a select one of said two output networks associated with the same ring-out identification information successfully found within said second memory means by said second comparison means, when said first indication signal and said second indication signal respectively are of said first and second predetermined values.

* * * * *

UNITED STATES PATENT AND TRADEMARK OFFICE
CERTIFICATE OF CORRECTION

PATENT NO. : 5,251,213
DATED : October 5, 1993
INVENTOR(S) : Gary B. Videlock, Russell C. Gocht, Tom P. Gloria, and Douglas Wainer It is certified that error appears in the above-indentified patent and that said Letters Patent is hereby corrected as shown below:

Claim 10, column 16, line 20, delete "fourth" and substitute therefor -- four --;

Claim 12, column 16, line 43, delete "sixteen-bit" and substitute therefor -- sixteen bit --;

Claim 12, column 16, line 51, delete "sixteen-bit" and substitute therefor -- sixteen bit --;

Claim 12, column 16, line 55, delete "sixteen-bit" and substitute therefor -- sixteen bit --.

Signed and Sealed this

Twenty-second Day of March, 1994

Attest:

BRUCE LEHMAN

Attesting Officer     Commissioner of Patents and Trademarks